United States Patent

[11] 3,633,854

| [72] | Inventors | Hans-Dieter Buchholz<br>Oberuhldingen;<br>Hans-Peter Reerink, Meersburg, both of<br>Germany |
|---|---|---|
| [21] | Appl. No. | 820,429 |
| [22] | Filed | Apr. 30, 1969 |
| [45] | Patented | Jan. 11, 1972 |
| [73] | Assignee | Bodenseewerk Geratetechnik<br>Ueberlingen/Bodensee, Germany |
| [32] | Priority | Oct. 10, 1968 |
| [33] | | Germany |
| [31] | | P 18 02 255.4 |

[54] SPEED CONTROLLER
4 Claims, 7 Drawing Figs.

[52] U.S. Cl. .................................................. 244/77 D,
244/77 S, 318/619
[51] Int. Cl. ..................................................... B64c 13/18
[50] Field of Search........................................... 244/77, 77
D, 77 A, 77 DZ, 77 M, 77 S; 318/619

[56] References Cited
UNITED STATES PATENTS

| 3,405,337 | 10/1968 | Popik ........................... | 244/77 MX |
| 3,425,649 | 2/1969 | Colwell et al. ................ | 244/77 M |
| 2,948,496 | 8/1960 | Joline ........................... | 244/77 D |
| 3,063,662 | 11/1962 | Rotier ........................... | 244/77 DZ |
| 3,246,220 | 4/1966 | Shinners ....................... | 244/77 X |
| 3,327,972 | 6/1967 | Greene ......................... | 244/77 D |
| 3,448,948 | 6/1969 | Reerink......................... | 244/77 D |

Primary Examiner—Milton Buchler
Assistant Examiner—Jeffrey L. Forman
Attorney—Edward R. Hyde, Jr.

ABSTRACT: A servocontrol loop is described, having a speed-regulating means, and means for providing a control signal to the speed-regulating means for varying aircraft speed when aircraft speed deviates from a command speed. A servo loop signal $\Delta v$ representative of this aircraft speed deviation is applied to means including a signal amplitude sensor which exhibits a threshold response established at a signal level representative of a predetermined speed deviation from the command speed. A value of $\Delta v$ exceeding the threshold level causes the application of a control signal to the servo loop for counteracting the excess of speed deviation from the threshold value.

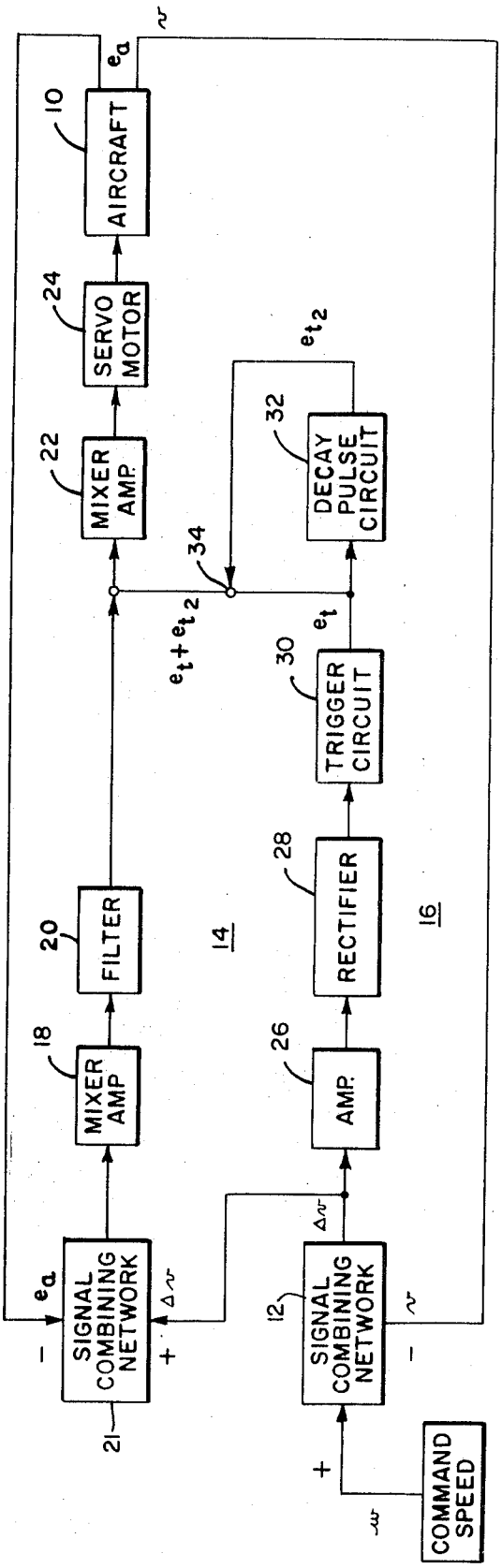
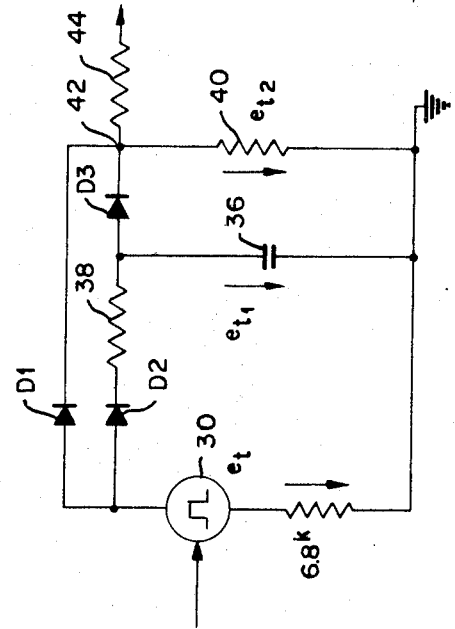
FIG. 1
FIG. 2
FIG. 3
INVENTOR
HANS-DIETER BUCHOLZ
HANS-PETER REERINK
BY
ATTORNEYS

SPEED CONTROLLER

The present invention relates to a speed controller for aircraft. The invention relates more particularly to a servocontrol arrangement for controlling the aircraft speed with respect to ambient air in accordance with a speed measured value such as the dynamic pressure or the angle of attack.

A known speed controller for an aircraft comprises a closed servoloop having a servomotor coupled to a throttle or other aircraft speed-regulating means and operating in response to an input signal representative of the difference in speed of the aircraft from a command speed.

The problem of avoiding excessive throttle movement during control is a common problem encountered with speed controllers. It is desirable to avoid creating a large thrust accompanied by heavy noise of the engine followed by a reduced thrust in rapid succession. A throttle movement of this type increases fuel consumption and engine wear, and additionally creates an unpleasant sensation for aircraft passengers. The latter aspect, in particular, is of particular significance in civil aviation. Therefore, the speed controller has been adapted to exhibit a relatively slow response when possible. On the other hand, however, it is important that a minimum safe speed characteristic of the aircraft for its loaded weight and the position of aircraft control surfaces be maintained. It is particularly important during landing approach that the flight speed be maintained sufficiently above that speed at which a stalling occurs. Moreover, at cruising speeds it is important that a particular Mach number is not exceeded.

An improvement to this servo speed controller, which is disclosed and claimed in copending U.S. Pat. application, Ser. No. 822,650, filed on May 7, 1969 and assigned to the assignee of this invention, comprises means for automatically operating on the servoloop during a period of time corresponding to an initial portion of an aircraft disturbance for compensating for the disturbance. More particularly, there is disclosed in this patent application the provision of a control program which controls the aircraft according to predetermined empirical values, independently of the servocontrol, when specific aircraft disturbances occur or are exceeded. The servo controller may then be adapted to exhibit a relatively slow response, thereby avoiding large or rapid responses to deviations or accelerations. When, however, certain disturbances occur, such as disturbances caused by the pilot which are not sufficiently controlled by the now slow acting servoloop, a predetermined program control will occur, and operates to cause the aircraft to return to a state in which it can again be controlled by the slow acting servoloop of the speed controller.

It is an object of this invention to provide an improved aircraft speed controller of the type referred to.

It is another object of the invention to provide an arrangement for safely controlling the aircraft under the influence of dangerously large deviations in the aircraft speed.

It is another object of the invention to inhibit the aircraft speed from falling below the command speed by a predetermined value.

In accordance with a feature of this invention, a servocontrol loop is provided having a speed regulating means, and means for providing a control signal to the speed regulating means for varying aircraft speed when aircraft speed deviates from a command speed. A servoloop signal $\Delta v$ representative of this aircraft speed deviation is applied to means including a signal amplitude sensor which exhibits a threshold response established at a signal level representative of a predetermined speed deviation from the command speed. A value of $\Delta v$ exceeding the threshold level causes the application of a control signal to the servoloop for counteracting the excess of speed deviation from the threshold value.

In a particular embodiment of the invention the threshold comprises a voltage-sensitive circuit means. Within a range of speeds established by the threshold value sensor, the speed controller operates under the control of the closed servoloop. A signal representative of a speed measured value such as dynamic pressure is effective to change a speed regulating variable, as for example, the thrust of the engine when aircraft speed signal $v$ deviates from the command speed signal $w$. The speed measured value is thereby maintained at a predetermined command speed. However, when the deviation signal $\Delta v$ exceeds a predetermined magnitude, which magnitude is established by the threshold value of the sensor, then a signal $e_t$ which is independent of the servo control is applied to the servomotor or to a servomotor drive amplifier for effecting an additional increase or decrease in engine thrust and returning aircraft speed to the command speed independently of the operation of the normal servoloop.

It is found advantageous to superimpose a signal from a longitudinal accelerometer on the speed measured signal $v$ in order to suppress the influence of temporary gusts on the thrust adjustment. When using a servomotor without position feedback and a controller with a longitudinal acceleration signal, then feedback is effectively accomplished through aircraft acceleration. The aircraft will be accelerated for providing that the longitudinal acceleration signal counter balances the applied additional signal.

The operation of the threshold sensor and application of the signal $e_t$ to the servoloop causes a change in the speed of the aircraft, for example, so that the aircraft speed deviation from the command speed is reduced to the predetermined threshold value of the deviation. If upon restoration of the aircraft speed deviation to the predetermined threshold value the signal $e_t$ is suddenly removed, then this would result in a relatively long delay accompanied by a relatively fast return of the speed regulating variable, for example the throttle, to the original value. A throttle movement occurs thereby causing a repeated overshoot of the deviation threshold value. For this reason, and in accordance with another feature of the invention, means are provided for controlling the decay of the signal $e_t$ after the predetermined deviation has been compensated.

In the case of a relatively small overshoot of the predetermined value of the deviation, it can occur that the signaled decay time is greater than the time during which the predetermined value of the speed deviation is exceeded. An unnecessarily large speed compensation would then occur. In accordance with another feature of this invention, this effect is avoided by making the signal decay time dependent on the period of overshoot of the predetermined deviation.

In a particular use of the invention, application of the signal $e_t$ is effected when the aircraft speed decreases below a predetermined deviation from the command speed. A safety provision is thereby provided assuring that the flight speed does not decrease to a value at which stalling occurs.

These and other objects and features of the invention will become apparent with reference to the following specifications and the drawings wherein:

FIG. 1 is a diagram in block form illustrating a speed controller constructed in accordance with features of this invention;

FIG. 2 is a circuit diagram illustrating a circuit arrangement for controlling the decay of the signal $e_t$ provided by the controller of FIG. 1;

FIG. 3 illustrates the generation of a decay pulse in accordance with the duration of a trigger signal; and, FIGS. 4–7 are curves useful in explaining the operation of the speed controller of FIG. 1.

Figure 4:
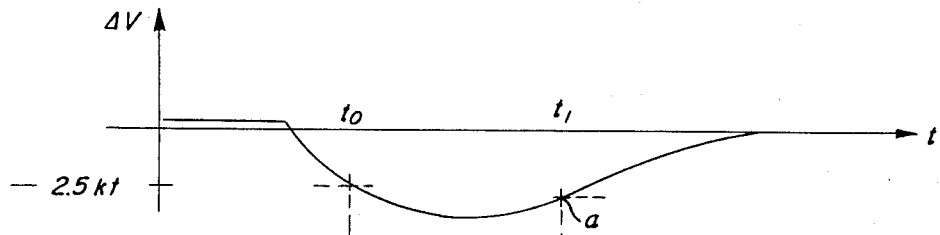
Figure 5:
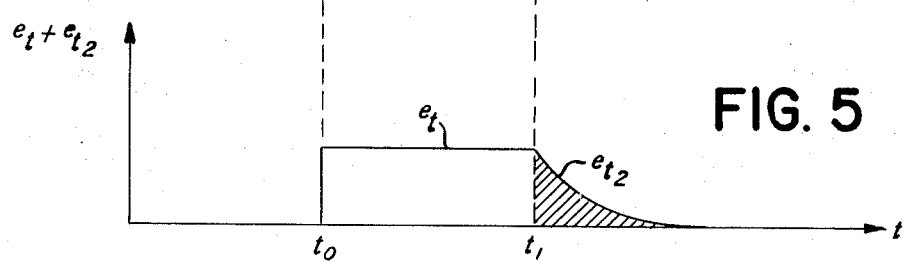

Referring now to FIG. 1, a servo speed controller is illustrated for providing speed control regulation of the aircraft at a desired command speed. A command speed signal $w$ which is adjustable by the pilot is coupled in opposition to a signal $v$ representative of aircraft speed. The speed signal $v$ is, for example, derived from a dynamic pressure pickup. The signal $v$ is shown derived from the aircraft 10 and combined with the command speed signal $w$ by circuit means 12 to provide a difference signal $\Delta v$. The signal $\Delta v$ is applied to two signal channels referenced as 14 and 16. Channel 14 comprises a portion of a linear speed controller and includes a mixer-amplifier 18 and filter 20. An acceleration signal $e_a$, derived from a longitudinal accelerometer (not shown) in the aircraft is combined with the deviation signal $\Delta v$ in a signal-combining network 21 and the resultant is coupled to the mixer amplifier 18. The acceleration signal $e_a$ normally functions to suppress the influence of temporary gusts on the engine thrust. When a headwind gust acts upon the aircraft then the airspeed of the aircraft relative to ambient air is increased; the dynamic pressure increases; and a deviation signal $\Delta v$ is generated. At the same time, however, the aircraft ground speed is reduced and a negative acceleration signal $e_a$ is also generated. The application of the acceleration signal to the servoloop then advantageously opposes the deviation signal $\Delta v$ and inhibits throttle movements which would ordinarily occur as a result of the deviation signal $\Delta v$. The output of the mixer-amplifier 18 is coupled to the filter 20 and is then applied to a second mixer-amplifier 22 which drives a servomotor 24 without position feedback. Adjustment of the engine throttle represented by $\delta$ is thereby effected and causes a change in the engine thrust of the aircraft 10. Alternatively, the aircraft speed is altered in response to a signal from amplifier 22 by the application of this signal to a servocontrol of an aircraft control surface.

The speed controller is arranged for providing the smallest possible throttle movement. It can occur, however, that during aircraft operations such as a landing approach the airspeed deviation exceeds a particular critical value. This may occur for example when the airspeed deviation is less than the command speed by a predetermined amount such as 2.5 knots, as illustrated in FIG. 4. In this case, the airspeed can reduce to a value near that value at which stalling occurs and lift ceases.

Figure 6:
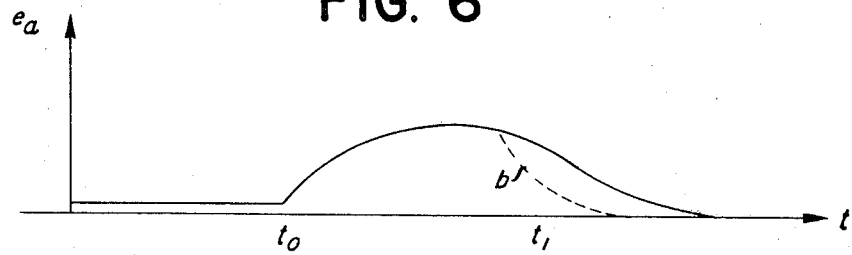
Figure 7:
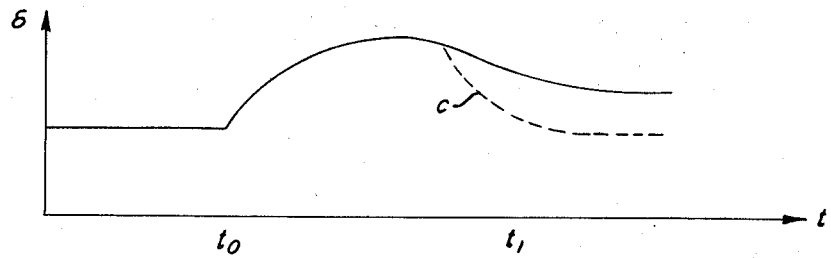

As a safety measure and in accordance with the present invention, a means comprising the channel 16 is provided and includes an amplifier 26 and a rectifier 28, polarized for coupling signals of a particular polarity to a trigger circuit 30. The rectifier 28 is polarized for coupling signals of negative polarity to the circuit 30 and it is noted that the signals used herein are DC signals. When the signal applied to trigger circuit 20 corresponds to a speed deviation from a command speed exceeding $-2.5$ knots, the trigger circuit switches into an unstable state and provides an output voltage. This output voltage $e_t$ is applied to the input of the second mixer-amplifier 22 and is superimposed on the signal from the speed controller channel 14. This constant amplitude signal $e_t$, in comparison with which the magnitude of the signal in channel 14 at this time is relatively negligible, is coupled through the mixer-amplifier 22 to servomotor 24 and causes the servomotor to adjust the throttle in a manner for accelerating the aircraft. An acceleration signal $e_a$ occurs which through the mixer-amplifier 18 and the filter 20 in channel 14 counteracts the trigger signal at the input of the second mixer-amplifier 22. A negative feedback is thereby effected through the acceleration of the aircraft so that the trigger signal $e_t$ effectively initiates a constant acceleration. As illustrated in FIG. 6, the acceleration increases gradually in accordance with the time constant of the servoloop. The acceleration effects an increase in the aircraft speed and approaches the command speed. As the magnitude of the airspeed deviation $\Delta v$ is reduced to the point a in FIG. 4 which represents a threshold value of $-2.5$ knots, the trigger circuit 30 is returned to its initial state and an output signal $e_t$ of the trigger circuit is terminated. When this signal $e_t$ is terminated instantaneously, i.e., with a very short fall time, the acceleration signal $e_a$ supplied by the longitudinal accelerometer remains as in input signal and becomes controlling. The signal $e_a$ will then, through the amplifier 18, the filter 20, and the amplifier 22 effect a relatively rapid throttle decrease. This occurs since the servoloop then sees an electrical indication of high acceleration and operates to cause a rapid decrease in the acceleration. Acceleration and throttle position would vary approximately in accordance with the dotted segments $b$ and $c$ of the curves of FIGS. 6 and 7 respectively. A rapid throttling of this nature to the initial value is accomplished by another overshoot of the threshold value of the deviation of $-2.5$ knots. In addition, in other respects, the throttle movement which occurs is undesired.

According to another feature of the invention, this effect is avoided by the provision of means for generating a desired decay voltage when the deviation limit value is exceeded. The trailing edge of the signal $e_t$ will then decay to its initial value in a finite time and this falling edge is represented by the decay pulse segment $e_{t2}$ of FIG. 3. This form of signal decay will lead to an acceleration and a throttle movement $\delta$ as shown by the solid line curves in FIGS. 6 and 7 respectively. The throttle then assumes a new position corresponding to a slightly increased fuel supply rate over the original fuel supply rate. This increase corresponds approximately to the area below the decay signal $e_2$.

It is desirable to avoid the relatively long time application of the decay pulse $e_{t2}$ in those instances when an excess in the deviation from the threshold value occurs for a relatively short interval of time. In accordance with another feature of this invention, the means providing a decay pulse $e_{t2}$ is adapted for providing a decay pulse having decay which is dependent on the duration of the trigger pulse $e_t$. The decay pulse $e_{t2}$ is provided by a circuit 32 and is superimposed on the trigger pulse $e_t$ as indicated symbolically at 34. The time-dependent generation of the decay pulse is effected by providing that during the duration of the trigger pulse $e_t$ the pulse is applied to an integrating circuit comprising a capacitor 36 (FIG. 2) which is charged through a charging resistor 38. The voltage $e_{t1}$ across the capacitor 36 is substantially proportional to the duration $t_1$ of the trigger pulse $e_t$ when $t_1$ is substantially less than a time constant of the RC circuit formed by the capacitor 36 and the resistor 38. When the pulse $e_t$ is of sufficiently long duration, the capacitor 36 will be charged to the voltage $e$. If the trigger pulse terminates at a time $t$, the capacitor 36 will then discharge through a resistor 40. The voltage $e_{t2}$ across the resistor 40 supplies the decay pulse.

The operation of the circuit of FIG. 2 is explained in the following manner. The output voltage $e_t$ of trigger circuit 30 is coupled via a diode $D_1$ to a point 42. The output voltage $e_1$ of the trigger circuit 30 charges the capacitor 36 through a second diode $D_2$ of the resistor 38. A voltage $e_{t1}$ is then applied across the capacitor 36. The capacitor is coupled through a diode $D_3$ to the point 42 and the resistor 40 is coupled in parallel with the capacitor 36 at this point when the diode $D_3$ is forward biased. The voltage $e_{t2}$ occurring at point 42 is coupled through a resistor 44 to the input of the mixer-amplifier 22. When the trigger circuits 23 supplies an output voltage $e_t$ during the interval from $t_0$ to $t_1$ (FIG. 3), a voltage $e_t$ is coupled to the point 42 through the diode $D_1$ while the capacitor 36 is simultaneously charging to this voltage through the diode $D_2$ and charging resistor 38. Since the voltage developed across the capacitor 36 is less than, or at most equal to the voltage $e_t$ which exists at point 42, then the diode $D_3$ is back-biased and represents a high impedance. When the trigger circuits 30 returns to its initial state, the voltage $e_t$ at point 42 decreases accordingly. Since the voltage across the capacitor 36 is now more positive than the voltage at point 42, the diode $D_3$ becomes forward biased and conductive, and the capacitor will discharge through the resistor 40, the voltage $e_{t2}$ dropping across the resistor 40. The diode $D_2$ is now back-biased and prevents an additional discharge of the capacitor 36 through the resistor 38. The voltage $e_{t2}$ decays to zero in accordance with the amount of charge on the capacitor 36 and thus in accordance with the interval of time $t_0$ to $t_1$ of the trigger pulse, as can be seen from FIG. 3.

In an alternative arrangement two or more signal channels 16 are provided for causing signals of differing magnitudes to become effective in accordance with the occurrence of deviations of different magnitudes. Further, the magnitude of the triggering pulse on trigger circuit 30 may be made dependent steadily on the deviation.

An improved aircraft speed controller has thus been described which advantageously inhibits the aircraft speed from varying in excess of a preestablished magnitude from a command speed.

While I have illustrated and described a particular embodiment of my invention, it will be understood that various

What is claimed is:

1. In a speed controller for an aircraft having a closed servoloop including a servomotor without position feedback means and arranged for regulating airspeed at a command speed and including a means for generating an electrical signal $\Delta v$ representative of the deviation in airspeed from the command speed, the improvement comprising a circuit means responsive to the signal $\Delta v$ for sensing a predetermined deviation in airspeed in excess of the command speed and circuit means for generating signal $e_t$ for application to the servo loop for counteracting the deviation;

means for providing a signal $e_a$ representative of the longitudinal acceleration of the aircraft and for combining said signal $e_a$ with the signal $\Delta v$;

said servoloop includes a first signal channel for receiving a signal $\Delta v$ and a signal $e_a$ and for amplifying a resultant of these signals and applying the amplified resultant signal to speed regulating means, a second channel for receiving a signal $\Delta v$ including a trigger circuit adapted for generating an output pulse $e_t$ when the signal $\Delta v$ exceeds a predetermined amplitude and for applying said pulse to said first channel for controlling the airspeed.

2. The speed controller of claim 1 wherein said first channel means includes a mixer-amplifier adapted for combining the signals $\Delta v$ and $e_a$ and for providing an amplified resultant signal.

3. The speed controller of claim 2 including circuit means for coupling said trigger circuit to said first signal channel and integrating circuit means for increasing the fall time of a trailing edge of said pulse.

4. The speed controller of claim 3 wherein said trigger circuit coupling means comprises a first diode and said integrating circuit means includes an RC circuit, a second diode intercoupling said trigger circuit and said integrating circuit, and a third diode for coupling an output voltage from said integrating to said first signal channel.

* * * * *